(12) United States Patent
Onuma

(10) Patent No.: US 6,370,557 B1
(45) Date of Patent: Apr. 9, 2002

(54) PROCESSING APPARATUS AND METHOD OF THE SAME

(75) Inventor: Koichi Onuma, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/326,693

(22) Filed: Jun. 7, 1999

(30) Foreign Application Priority Data

Jun. 15, 1998 (JP) ............................................ 10-167418

(51) Int. Cl.[7] ................................................ G06F 7/48
(52) U.S. Cl. ...................................... 708/490; 708/523
(58) Field of Search ................................ 708/490, 501, 708/523

(56) References Cited

U.S. PATENT DOCUMENTS 5,517,437 A * 5/1996 Yamashita et al. .......... 708/490

5,974,435 A * 10/1999 Abbott ........................ 708/523

\* cited by examiner

*Primary Examiner*—David H. Malzahn
(74) *Attorney, Agent, or Firm*—Ronald F. Kananen; Rader, Fishman & Grauer

(57) ABSTRACT

A processing apparatus capable of reducing the size of the circuit, where in order to perform an operation "(A−B)×C", provision is made of multiplexers $50_0$ to $50_{15}$ provided corresponding to each of all combinations of natural numbers i and j which receive as their inputs bit data $A_i$, $B_i$, and $C_j$, output the bit data $A_i$ when the $C_j$ has the logical value "1", and output the bit data $B_i$ when the $C_j$ has the logical value "0", and the bit data output from the multiplexers $50_0$ to $50_{15}$, data obtained by shifting the complement data of 2 of the data B by exactly n bits toward the most significant bit, the data B and the carry data as the carrying from the lower significant bit are added for every bit so as to add the bit data output from the multiplexers $50_0$ to $50_{15}$ to the (i+j)th bit.

10 Claims, 11 Drawing Sheets

FIG.9

| | $a_4$ | $a_3$ | $a_2$ | $a_1$ | $a_0$ | |
|---|---|---|---|---|---|---|
| | $b_4$ | $b_3$ | $b_2$ | $b_1$ | $b_0$ | |
| | $\overline{a_4b_0}$ | $a_3b_0$ | $a_2b_0$ | $a_1b_0$ | $a_0b_0$ | |
| | $a_3b_1$ | $a_2b_1$ | $a_1b_1$ | $a_0b_1$ | | |
| | $a_2b_2$ | $a_1b_2$ | $a_0b_2$ | | | |
| | $a_1b_3$ | $a_0b_3$ | | | | |
| | $\overline{a_0b_4}$ | | | | | |
| | $b_4$ | | | | | |
| | $a_4$ | | | | | |
| | $\overline{a_4b_1}$ | $a_3b_2$ | $a_2b_3$ | $a_1b_4$ | | |
| | $\overline{a_4b_2}$ | $a_3b_3$ | $a_2b_4$ | | | |
| | $\overline{a_4b_3}$ | $a_3b_4$ | | | | |
| $\overline{a_4}$ | $a_4b_4$ | | | | | |
| $\overline{b_4}$ | | | | | | |
| 1 | | | | | | |
| $S_9$ | $S_8$ | $S_7$ | $S_6$ | $S_5$ | $S_4$ | $S_3$ | $S_2$ | $S_1$ | $S_0$ |

PROCESSING APPARATUS AND METHOD OF THE SAME

BACKGROUND OF THE INVENTION

Field of the Invention

The present invention relates to a processing apparatus and a method of the same. 2. Description of the Related Art A processing apparatus which receives as its inputs positive binary data A, B, and C and performs an operation "(A−B)×C", is known in the art.

Below, an explanation will be made of a processing apparatus of the related for performing the operation "(A−B)×C".

FIG. 6 is a view of the configuration of the processing apparatus of the related for performing the operation "(A−B)×C".

As shown in FIG. 6, the processing apparatus 1 has a subtracter 2 and a multiplier 3 and performs the operations "(A−B)×C" by using the 4-bit data A, B, and C.

The processing apparatus 1, for example, performs the subtraction of the 4-bit data A and the 4-bit data B at the subtracter 2 and the multiplication of the signed 5-bit subtraction result Y and the 5-bit data C with a most significant bit (MSB) having a logical value "0" due to code expansion at the multiplier 3. Then, the multiplication result of the multiplier 3 becomes the result of the operation "(A−B)×C".

As the subtracter 2, for example, as shown In FIG. 7. a ripple carry type adder comprised of full adders (FA) $10_0$, $10_1$, $10_2$, and $10_3$ connected in series, is used.

In this subtracter 2, "1" for finding a complement of 2 is Input to a Ci (Carry In) terminal of the full adder $10_1$ performing the operation corresponding to the least significant bit (LSB). Further, the bit data $A_0$ to $A_3$ of the data A are Input to the full adders $10_0$ to $10_3$ and the bit data $B_0$ to $B_3$ of the data B are Input via inverters $11_0$ to $11_3$. Then, bit data $Y_0$ to $Y_3$ of the 4-bit result Y are output from s terminals of the full adders $10_0$ to $10_3$ and bit data $Y_4$ indicating the sign of the subtraction result Y Is output from a CO (Carry Out) terminal of the full adder $10_3$.

Note that, as the full adders $10_1$ to $10_3$, as shown In FIG. 8, use is made of a general full adder constituted by combining AND circuits $15_1$, and $15_2$, OR and $17_2$. At the full adders $10_1$ to $10_3$, bit data input through an $in_1$ terminal, $in_2$ terminal, and Ci (Carry in ) terminal are added, the carry of the addition result Is output from the CO (Carry out) terminal, and sum data Is output from the S terminal.

Next, an explanation will be made of the configuration of the multiplier 3 shown In FIG. 6.

FIG. 9 Is a view for explaining a complement multiplication of 2 according to the Baugh Wooly method adopted by the multiplier 3.

A FIG. 10 is a view of the configuration of the multiplier 3 performing the complement multiplication of 2 shown in FIG. 9.

As shown in FIG. 10, the multiplier 3 has a partial product adder circuit 20 and a final stage adder circuit 30.

The partial product adder circuit 20 adopts the Wallace-tree method and has AND circuits $21_0$ to $21_{24}$, full adders $22_1$ to $22_{13}$, half adders $23_1$ to $23_3$, and inverter circuits $24_1$ to $24_{11}$.

Further, the final adder circuit 30 adopts the Ripple Carry method and has full adders $22_{14}$ to $22_{19}$ and half adders $23_4$ and $23_5$.

Here, the full adders $22_{14}$ to $22_{19}$ have the configuration shown in FIG. 8 mentioned above. Further, as the half adders $23_1$ to $23_3$, as shown in FIG. 11, provision is made of an AND circuit $15_3$ and an XOR circuit $17_3$, data input through the in terminal and the $in_2$ terminal are added, the carry of the related addition result is output from the CO (Carry Out) terminal, and the sum data is output from the S terminal.

At the multiplier 3, the AND circuits $21_1$ to $21_{24}$ of the partial product adder circuit 20 use the bit data $Y_0$, $Y_1$, $Y_2$, $Y_3$, and $Y_4$ of the subtraction result Y from the subtracter 2 and the bit data $C_0$, $C_1$, $C_2$, $C_3$, and 0 with an MSB having the logical value "0" due to code expansion for the partial products shown in FIG. 9. Then, the partial products are added at the full adders $22_1$ to $22_{19}$ and the half adders $23_1$ to $23_5$ of the partial product adder circuit 20 and the final stage adder circuit 30 including a carry from a lower digit for every digit. By this, sum data output from the output terminal of the AND circuit $21_0$ and s terminals of the half adders $23_1$ and $23_4$, the full adders $22_{14}$, $22_{15}$, $22_{16}$, $22_{17}$, $22_{18}$, and $22_{19}$, and the half adder $23_5$ become bit data $S_0$, $S_1$, $S_2$, $S_3$, $S_4$, $S_5$, $S_6$, $S_7$, $S_8$, and $S_9$ of the 10-bit result S.

Summarizing the problem to be solved by the invention, in the processing apparatus 1 of the related art mentioned above, as shown in FIG. 7 and FIG. 10, there is a disadvantage that there are the full adders $10_0$ to $10_3$, AND circuits $21_0$ to $21_{24}$, full adders $22_1$ to $22_{19}$, half adders $23_1$ to $22_5$, and inverter circuits $24_1$ to $24_{11}$ and the size of the circuit becomes large.

Namely, in the processing apparatus 1, as shown in FIG. 1, in order to perform the subtraction at the subtracter 2, when using 4-bit data A and B, the result thereof becomes 5 bits, including the sign bit. As a result, at the multiplier 3, it is necessary to perform the multiplication of 5 bits and the size of the circuit becomes large.

Further, in the processing apparatus 1 of the related art mentioned above, the critical path of the operation becomes the full adders $10_0$ to $10_3$, half adder $23_4$, full adders $22_{14}$, $22_{15}$, $22_{16}$, $22_{17}$, $22_{18}$, and $22_{19}$, and the half adder $23_5$, so there is a disadvantage that the processing time becomes long.

SUMMARY OF THE INVENTION

An object of the present invention is to provide a processing apparatus capable of reducing the size of the circuit performing the operation "(A−B)×C".

Another object of the present invention is to provide a processing apparatus capable of shortening the processing time of the operation "(A−B)×C".

According to a first aspect of the present invention, there is provided a processing apparatus for calculating "(A−B)×C" where the bit data A is constituted by the n-bit data of $A_i$ (i=0, 1, ... n−1), the bit data B is constituted by the n-bit data of $B_i$ (i=0, 1, ... n−1), and the bit data C is constituted by the n-bit data of $C_j$ (j=0, 1, ... n−1), said processing apparatus comprising: a bit data selecting means for receiving as input the bit data $A_i$, $B_i$, and $C_j$, and outputting the bit data $A_i$ when $C_j$ equals to a first logical value or the bit data $B_i$ when data $C_j$ equals to a second logical value in response to data $C_j$ with respect to all combinations of the natural numbers i and J and an adding means for adding the bit data output from the bit data selecting means to the (i+j)th bit for each bit of all combinations of i and j, the data obtained by shifting the data of the complement of 2 of the data B by exactly n number of bits toward the most significant bit, and the data B.

The processing apparatus of the present invention performs the operation "(A−B)×C" based on the following equation (1):

$$S = \left( \sum_{j=0}^{j=n-1} \sum_{i=0}^{i=n-1} \cdot (A_j \cdot C_j \mid B_i \cdot \overline{C}_j) \right) - 2^n \times B + B \qquad (1)$$

That is, in the processing apparatus of the present invention, each of the plurality of bit data selecting means outputs the bit data $A_i$ when the input $C_j$ is the logical value "1" and outputs the bit data $B_i$ when $C_j$ is the logical value "0" among the input bit data $A_i$ and $B_i$.

Next, the adding means adds the bit data output from the bit data selecting means to the (i+j)th bit by adding for each bit the bit data output from the bit data selecting means, the data obtained by shifting the data of the complement of 2 of the data B by exactly n number of bits toward the most significant bit, the data B, and the carry data carried from a lower bit.

Preferably, it further provides with an inverted value generating means for inverting the bit data $B_0, B_1, \ldots, B_i, \ldots, B_{n-2}$, and $B_{n-1}$ to find the bit data $B_0^-, B_1^-, \ldots, B_i^-, \ldots, B_{n-2}^-$, and $B_{n-1}^-$; the adding means respectively adds the bit data $B_1^-, \ldots, B_i^-, \ldots, B_{n-1}^-$, found by the inverted value generating means to the (n+1)th, ..., (n+i)th, ..., (2n-1)th bits and adds the bit data $B_0^-$ and the logical value "1" to the n-th bit.

Preferably, the adding means adds the bit data $B_0, B_1, \ldots, B_i, \ldots, B_{n-2}$, and $B_{n-1}$ of the data B to the 0th, 1st, ..., i-th, ..., (n-2)th, and (n-1)th bits.

Preferably, the adding means outputs as the result of the addition (2n+1)bit data comprised of the bit data $S_0, S_1, \ldots, S_{2n-1}$ and $S_{2n}$ and the bit data $S_{2n}$ shows the sign value.

Preferably, the bit data selecting means each has a first transmission gate which becomes conductive when the input bit data $C_i$ is the logical value "1" and a second transmission gate which becomes conductive when the input bit data $C_i$ is the logical value "0".

According to a second aspect of the present invention, there is provided a processing method for calculating "(A−B)×C" where the bit data A is constituted by the n-bit data of $A_i$ (i=0, 1, ... n−1), the bit data B is constituted by the n-bit data of $B_i$ (i=0, 1, ... n−1), and the bit data C is constituted by the n-bit data of $C_j$ (j=0, 1, ... n−1), said processing method comprising the steps of: performing processing for receiving as input the bit data $A_i$, $B_i$, and $C_j$, selecting the bit data $A_i$ when data $C_j$ equals to a first logical value or $B_i$ when data $C_j$ equals to a second logical value in response to the bit data $C_j$ with respect to all combinations of the natural numbers i and j and adding the selected bit data to the (i+j)th bit for each bit of all combination of i and j, the data obtained by shifting the data of the complement of 2 of the data B by exactly n number of bits toward the most significant bit, and the data B.

BRIEF DESCRIPTION OF THE DRAWINGS

These and other objects and features of the present invention will become more apparent from the following description of the preferred embodiments given with reference to the attached drawings, wherein:

FIG. 9 is a view for explaining a complement multiplication of 2 by the Baugh Wooly method adopted by the multiplier shown in FIG. 2;

DESCRIPTION OF THE PREFERRED EMBODIMENTS

Below, an explanation will be made of a processing apparatus according to an embodiment of the present invention and a method of the same.

Figure 1:
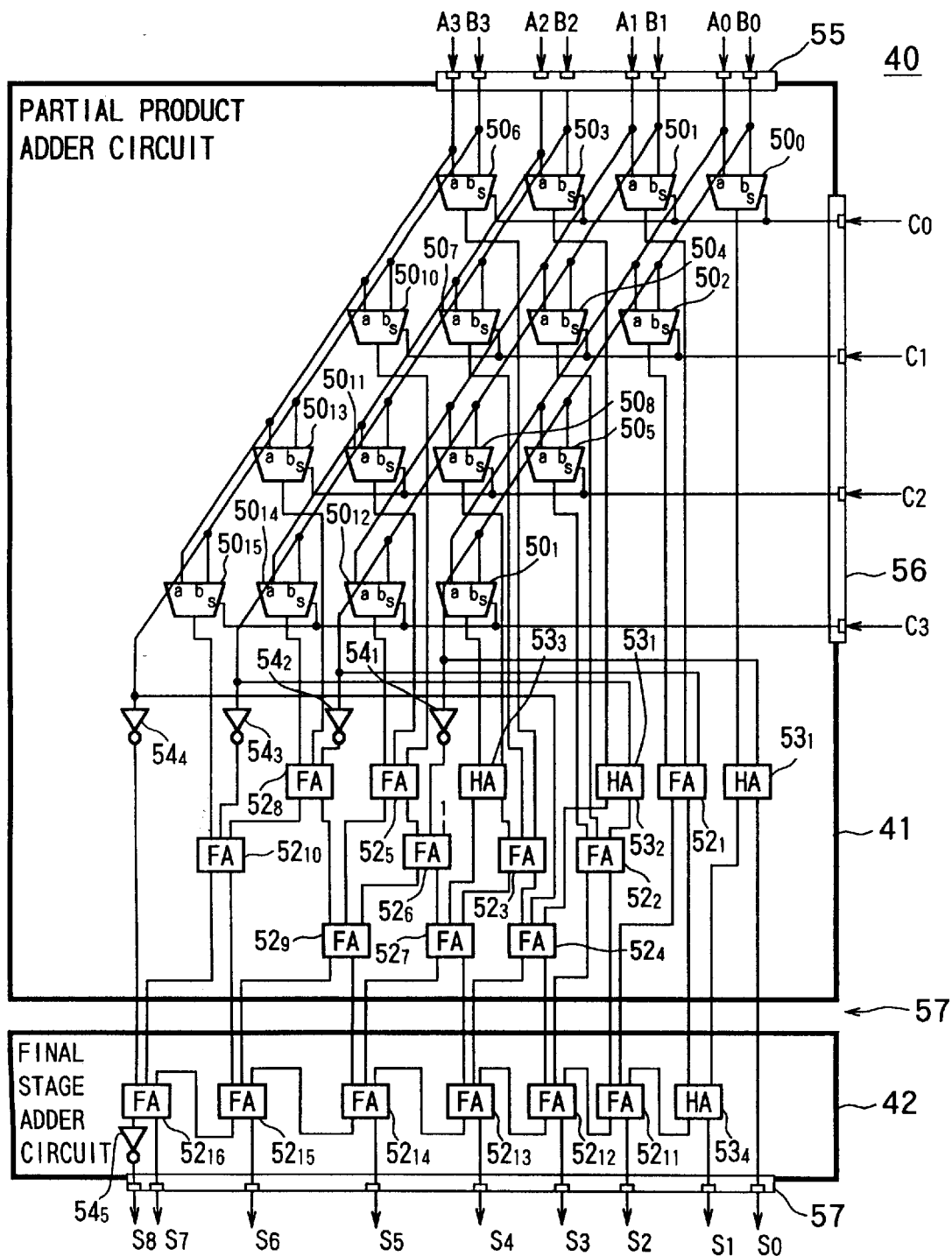
FIG. 1 is a view of the configuration of a processing apparatus according to the present embodiment.

FIG. 1 is a view of the configuration of a processing apparatus 40 for performing an operation "S=(A−B)×C" using the 4-bit data A, B, and C.

As shown in FIG. 1, the processing apparatus 40 has a partial product adder circuit 41 and a final stage adder circuit 42.

The partial product adder circuit 41 has multiplexers $50_0$ to $50_{15}$ as the bit data selecting means of the present invention, full adders (FA) $52_1$ to $52_{10}$, half adders (HA) $53_1$ to $53_3$, inverter circuits $54_1$ to $54_4$, input units 55 and 56, and an output unit 57.

The final stage adder circuit 42 has full adders $52_{11}$ to $52_{16}$ and a half adder $53_4$.

The input unit 55 has $A_0, A_1, A_2, A_3, B_0, B_1, B_2$, and $B_3$ terminals for receiving as their inputs bit data $A_0, A_1, A_2, A_3, B_0, B_1, B_2$, and $B_3$.

Here, the 4-bit data A is comprised by bit data $A_0, A_1, A_2$, and $A_3$, while the 4-bit data B is comprised by bit data $B_0, B_1, B_2$, and $B_3$.

The input unit 56 has $C_0, C_1, C_2$, and $C_3$ terminals for receiving as input bit data $C_0, C_1, C_2$, and $C_3$.

Here, the 4-bit data C is comprised by the bit data $C_0, C_1, C_2$, and $C_3$.

The output unit 57 has $S_0, S_1, S_2, S_3, S_4, S_5, S_6, S_7$, and $S_8$ terminals for outputting bit data $S_0, S_1, S_2, S_3, S_4, S_5, S_6, S_7$, and $S_8$.

Here, the 9-bit data S is comprised by the bit data $S_0, S_1, S_2, S_3, S_4, S_5, S_6, S_7$, and $S_8$.

The multiplexers $50_0$ to $50_{15}$ find partial products $P_{0,0}, P_{1,0}, P_{0,1}, P_{2,0}, P_{1,1}, P_{0,2}, P_{3,0}, P_{2,1}, P_{1,2}, P_{0,3}, P_{3,1}, P_{2,2}, P_{1,3}, P_{3,2}, P_{2,3}$, and $P_{3,3}$ defined by the following equation (2):

$$P_{ij} = A_i \cdot C_j \mid B_i \cdot \overline{C}_j \, (i=0\sim3\, j=0\sim3) \qquad (2)$$

Figure 2:
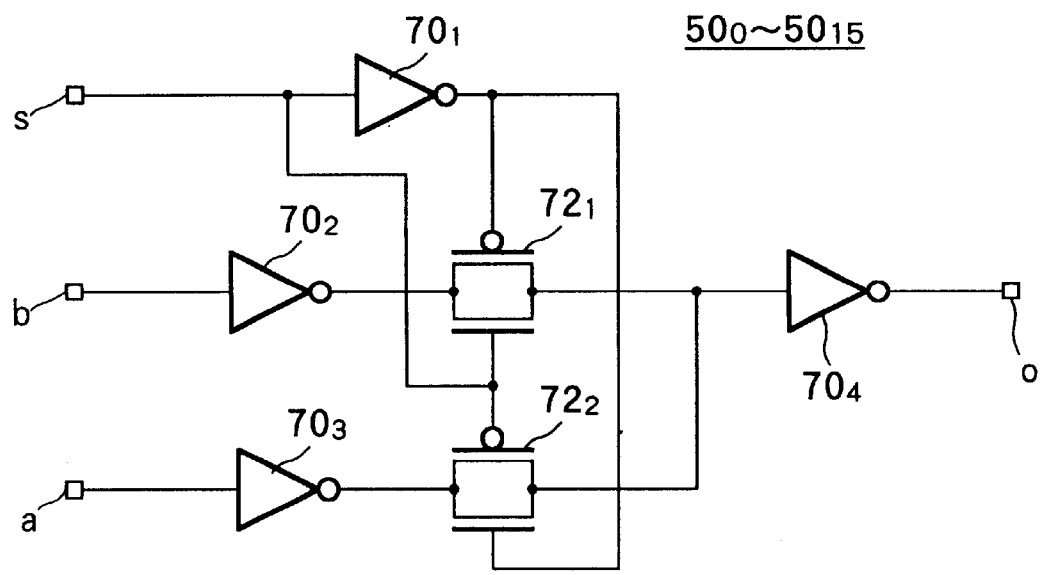
FIG. 2 is a view of the configuration of a multiplexer shown in FIG. 1.

FIG. 2 is a view of the configuration of multiplexers $50_0$ to $50_{15}$.

As shown in FIG. 2, the multiplexers $50_0$ to $50_{15}$ have inverters $70_1$ to $70_4$, transmission gates $70_1$ and $70_2$, an s terminal, an a terminal, a b terminal, and an o terminal.

At the multiplexers $50_0$ to $50_{15}$, when the s terminal has a logical value "1", the transmission gate $70_1$ is turned off, the transmission gate $70_2$ is turned on, and the level of the a terminal is output as the level of the o terminal. On the other hand, at the multiplexers $50_0$ to $50_{15}$, when the s terminal has a logical value "0", the transmission gate $70_1$ is turned on, the transmission gate $70_2$ is turned off, and the level of the b terminal is output as the level of the o terminal.

Namely, at the multiplexers $50_0$ to $50_{15}$, a bit data $A_i$ input to the a terminal is output from the o terminal when a bit data $C_j$ has the logical value "1", and a bit data $B_i$ input to the a terminal is output from the o terminal when the bit data $C_j$ has the logical value "0".

Partial products $P_{0,0}$, $P_{1,0}$, $P_{0,1}$, $P_{2,0}$, $P_{1,1}$, $P_{0,2}$, $P_{3,0}$, $P_{2,1}$, $P_{1,2}$, $P_{0,3}$, $P_{3,1}$, $P_{2,2}$, $P_{1,3}$, $P_{3,2}$, $P_{2,3}$, and $P_{3,3}$ calculated at the multiplexers $50_0$ to $50_{15}$ are added containing carries from the lower significant bits for every bit at full adders $52_1$ to $52_{16}$ and the half adders $53_1$ to $53_4$ so that they are added to an (i+j)th bit. By this, the operation "A×C+B×C⁻j" shown in the following equation (3) is performed.

$$A \times C + B \times \overline{C} = \sum_{j=0}^{j=3} \sum_{i=0}^{i=3} 2^{i+j} \cdot P_{ij} \qquad (3)$$

Figure 8:
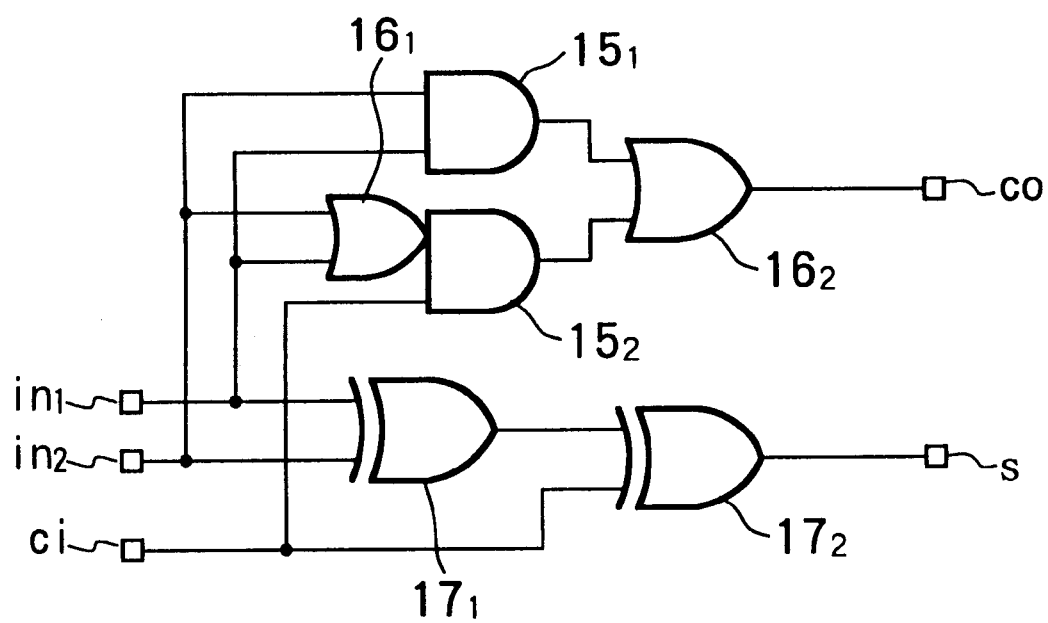
FIG. 8 is a view of the configuration of a full adder (FA) shown in FIG. 7.
Figure 11:
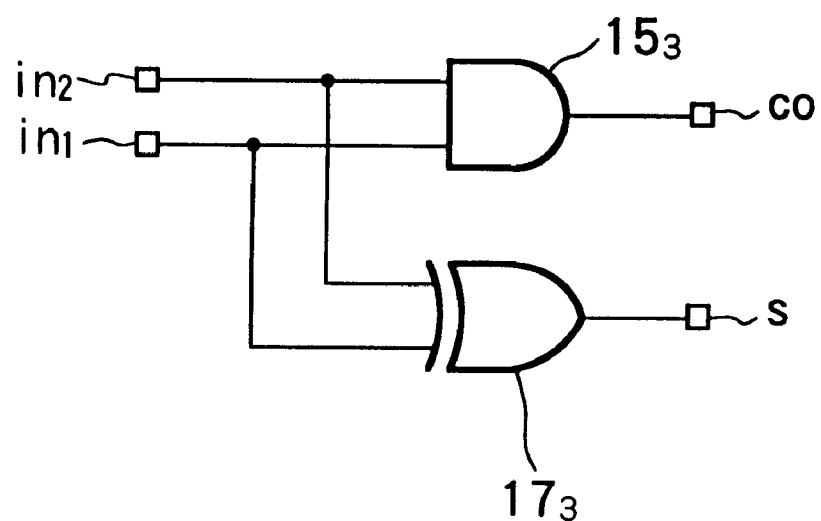
FIG. 11 is a view of the configuration of the half adder shown in FIG. 10.

Here, as the full adders $52_1$ to $52_{16}$, use is made of ones having the configuration shown in FIG. 8 mentioned before. Further, as the half adders $53_1$ to $53_4$, use is made of ones having the structure shown in FIG. 11 mentioned before.

The inverter circuits $54_1$, $51_2$, and $51_3$ to $51_4$ receive as their inputs the bit data $B_0$, $B_1$, $B_2$, and $B_3$ and output the inverted bit data $B_0^-$, $B_1^-$, $B_2^-$, and $B_3^-$.

The operations at the inverter circuits $54_1$ to $54_4$ correspond to inversion operations for performing the operation "$-2^4 \times B$". Further, by the addition carried out by inputting "1" to the Ci (Carry in) terminal of the full adder $52_6$, the "addition of 1" for performing the operation "$-2^4 \times B$" is carried out.

Further, bit data $B_0$ to $B_3$ are output to the $in_2$ terminals of the half adder $53_1$, full adder $52_1$, half adder $53_2$, and the full adder $52_4$. At the half adder $53_1$, full adder $52_1$, half adder $53_2$, and the full adder $52_4$, the operation of "+$B_j$" is carried out.

As mentioned above, by the full adders $52_1$ to $52_{16}$ and the half adders $53_1$ to $53_4$, the operation of the following equation (4) is performed by adding the result of "A×C+B×C⁻", "$-2^4 \times B$", and "B".

$$S = \left( \sum_{j=0}^{j=3} \sum_{i=0}^{i=3} 2^{i+j} \cdot P_{ij} \right) - 2^4 \times B + B \qquad (4)$$

Figure 3:
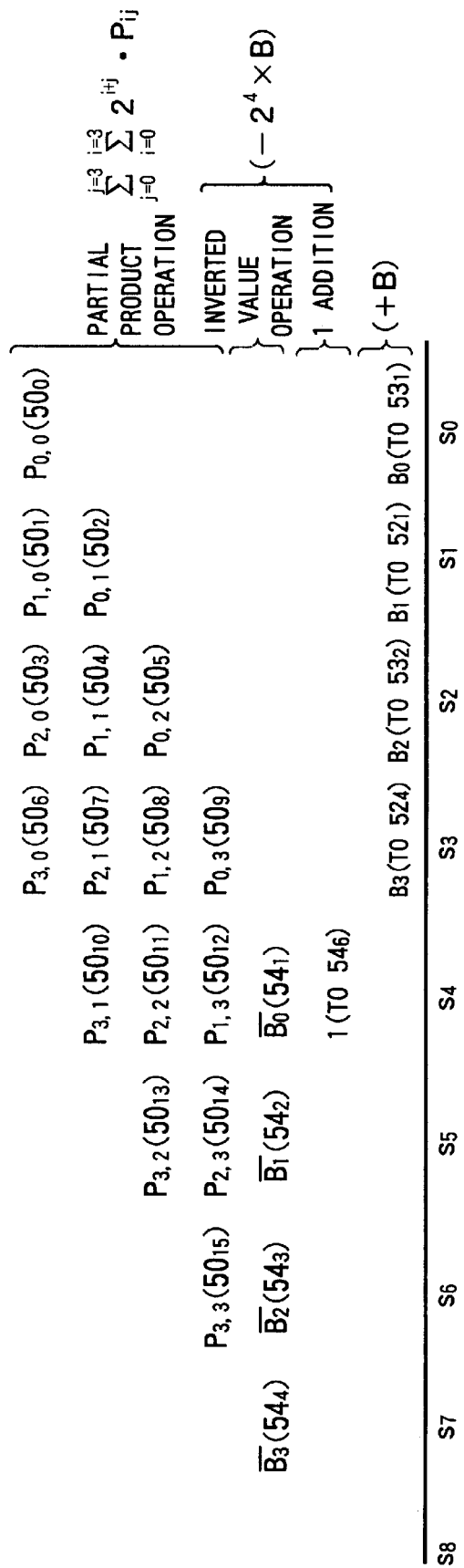
FIG. 3 is a view for explaining a processing method adopted by the processing apparatus shown in FIG. 1.

Note that the operation of the above equation (3) is represented as shown in FIG. 3.

Note that, in FIG. 3, the figures in parentheses indicate the reference numerals of the constituent elements of the processing apparatus 40 shown in FIG. 1 and indicate that the operation indicated adjoining this is found by the related constituent element or the data indicated adjoining this is input to the related constituent element.

Here, the above equation (4) is equivalent to the operation "S=(A−B)×C".

Below, the fact that above equation (4) is equivalent to the operation "S=(A−B)×C" will be proved.

The operation "S=(A−B)×C" can be modified as in the following equation (5):

$$S = (A - B) \times C \qquad (5)$$
$$= A \times C - B \times C$$
$$= A \times C + B \times (-C)$$

A complement $x^-$ of 1 of a binary x is indicated by the following equation (6):

$$\overline{x} = 1 \cdot x \qquad (7)$$

Accordingly, when the above equation (6) is applied to "−C" of the above equation 5), the following equation (7) stands:

$$-C = \overline{C} \sum_{i=0}^{i=3} 2^i \qquad (7)$$

Further, when the above equation (5) is rewritten by using the above equation (7) and further modification is made, the result becomes the following equation (8):

$$S = A \times C + B \times \left( \overline{C} - \sum_{i=0}^{i=3} 2^i \right) \qquad (8)$$
$$= A \times C + B \times \overline{C} - B x \sum_{i=0}^{i=3} 2^i$$
$$= A \times C + B \times \overline{C} x (2^4 - 1)$$
$$= A \times C + B \times \overline{C} x 2^4 \times B + B$$

Here, it is seen from above equation (8) and equation (3) that the operation "S=(A−B)×C" is equivalent to above equation (5).

Below, an explanation will be made of a connection configuration of the constituent elements of the processing apparatus 40 shown in FIG. 1.

The a terminals of the multiplexers $50_1$, $50_2$, $50_5$, and $50_9$ are connected to the $A_0$ terminal of the input unit 55, and the b terminals thereof are connected to the $B_0$ terminal of the input unit 55.

The a terminals of the multiplexers $50_1$, $50_4$, $50_8$, and $50_{12}$ are connected to the $A_1$ terminal of the input unit 55, and the b terminals thereof are connected to the $B_1$ terminal of the input unit 55.

The a terminals of the multiplexers $50_3$, $50_7$, $50_{11}$, and $50_{14}$ are connected to the $A_2$ terminal of the input unit 55, and the b terminals thereof are connected to the $B_2$ terminal of the input unit 55.

The a terminals of the multiplexers $50_6$, $50_{10}$, $50_{13}$, and $50_{15}$ are connected to the $A_3$ terminal of the input 1unit 55, and the b terminals thereof are connected to the $B_3$ terminal of the input unit 55.

The s terminals of the multiplexers $50_0$, $50_1$, $50_3$, and $50_6$ are connected to the $C_0$ terminal of the input unit 56.

The s terminals of the multiplexers $50_2$, $50_4$, $50_7$, and $50_{10}$ are connected to the $C_1$ terminal of the input unit 56.

The s terminals of the multiplexers $50_5$, $50_8$, $50_{11}$, and $50_{13}$ are connected to the $C_2$ terminal of the input unit 56.

The s terminals of the multiplexers $50_9$, $50_{12}$, $50_{14}$, and $50_{15}$ are connected to the $C_3$ terminal of the input unit 56.

The in terminal of the half adder $53_1$ is connected to the o terminal of the multiplexer $50_0$, and the $in_2$ terminal thereof is connected to the $B_0$ terminal of the input unit 55.

Further, the s terminal of the half adder $53_1$ is connected to the $S_0$ of the output unit 57, and the CO terminal thereof is connected to the $in_2$ terminal of the half adder $53_4$.

The $in_1$ of the full adder $52_1$ is connected to the o terminal of the multiplexer $50_2$, the $in_2$ terminal thereof is connected to the o terminal of the multiplexer $50_1$, and the Ci terminal thereof is connected to the $B_1$ of the input unit 55.

Further, the s terminal of the full adder $52_1$ is connected to the $in_1$ terminal of the half adder $53_4$, and the CO terminal thereof is connected to the $in_2$ terminal of the full adder $52_{11}$.

The $in_1$ terminal of the half adder $53_2$ is connected to the o terminal of the multiplexer $50_3$, and the $in_2$ terminal thereof is connected to the $B_2$ terminal of the input unit 55.

Further, the s terminal of the half adder $53_2$ is connected to the Ci terminal of the full adder $52_2$, and the $C_0$ terminal thereof is connected to the Ci terminal of the full adder $52_4$.

The $in_1$ terminal of the half adder $53_3$ is connected to the o terminal of the multiplexer $50_9$, and the $in_2$ terminal thereof is connected to the o terminal of the multiplexer $50_8$.

Further, the s terminal of the half adder $53_3$ is connected to the $in_1$ terminal of the full adder $52_3$, and the CO terminal thereof is connected to the $in_2$ terminal of the full adder $52_7$.

The full adder $52_5$ is connected at its $in_1$ terminal to the o terminal of the multiplexer $50_{12}$, connected at its $in_2$ terminal to the o terminal of the multiplexer $50_{11}$ and connected at its Ci terminal to the o terminal of the multiplexer $50_{10}$.

Further, the full adder $52_5$ is connected at its s terminal to the $in_1$ terminal of the full adder $52_6$ and connected at its CO terminal to the $in_2$ terminal of the full adder $52_9$.

The full adder $52_8$ is connected at its $in_1$ terminal to the o terminal of the multiplexer $50_{14}$, connected at its $in_2$ terminal to the o terminal of the multiplexer $50_{13}$, and connected at its Ci terminal to the output terminal of the inverter $54_2$.

Further, the full adder $52_8$ is connected at its s terminal to the $in_1$ terminal of the full adder $52_9$ and connected at its CO terminal to the Ci terminal of the full adder $52_{10}$.

The full adder $52_2$ is connected at its $in_1$ terminal to the o terminal of the multiplexer $50_5$ and connected at its $in_2$ terminal to the multiplexer $50_4$.

Further, the full adder $52_2$ is connected at its s terminal to the $in_1$ terminal of the full adder $52_{11}$ and connected at its CO terminal to the $in_2$ terminal of the full adder $52_{12}$.

The full adder $52_3$ is connected at its $in_2$ terminal to the o terminal of the multiplexer $50_7$ and connected at its Ci terminal to the o terminal of the multiplexer $50_6$.

Further, the full adder $53_3$ is connected at its s terminal to the $in_1$ terminal of the full adder $52_4$ and connected at its CO terminal to the Ci terminal of the full adder $52_7$.

The $in_2$ terminal of the full adder $52_6$ is connected the output terminal of the inverter $54_1$, and the logical value "1" is input to the Ci terminal thereof.

Further, the full adder $52_6$ is connected at its s terminal to the $in_1$ terminal of the full adder $52_7$ and connected at its CO terminal to the Ci terminal of the full adder $52_9$.

The full adder $52_1$ is connected at its $in_2$ terminal to the output terminal of the inverter $54_3$.

Further, the full adder $52_{10}$ is connected at its s terminal to the $in_1$ terminal of the full adder $52_{15}$ and connected at its CO terminal to the $in_2$ terminal of the full adder $52_{16}$.

The full adder $52_4$ is connected at its $in_2$ terminal to the $B_3$ terminal of the input unit 55.

Further, the full adder $52_2$ is connected at its s terminal to the $in_1$ terminal of the full adder $52_{12}$ and connected at its CO terminal to the $in_2$ terminal of the full adder $52_{13}$.

The full adder $52_7$ is connected at its s terminal to the $in_1$ terminal of the full adder $52_{13}$ and connected at its CO terminal to the $in_2$ terminal of the full adder $52_{14}$. The full adder $52_9$ is connected at its s terminal to the $in_1$ terminal of the full adder $52_{14}$ and connected at its CO terminal to the $in_2$ terminal of the full adder $52_{15}$.

The half adder $53_4$ is connected at its s terminal to the $S_1$ terminal of the output unit 57 and connected at its CO terminal to the Ci terminal of the full adder $52_{11}$.

The full adder $52_{11}$ is connected at its s terminal to the $S_2$ terminal of the output unit 57 and connected at its CO terminal to the Ci terminal of the full adder $52_{12}$.

The full adder $52_{12}$ is connected at its s terminal to the $S_3$ terminal of the output unit 57 and connected at its CO terminal to the Ci terminal of the full adder $52_{13}$.

The full adder $52_{13}$ is connected at its s terminal to the $S_4$ terminal of the output unit 57 and connected at its CO terminal to the Ci terminal of the full adder $52_{14}$.

The full adder $52_{14}$ is connected at its s terminal to the $S_5$ terminal of the output unit 57 and connected at its CO terminal to the Ci terminal of the full adder $52_{15}$.

The full adder $52_{15}$ is connected at its s terminal to the $S_6$ terminal of the output unit 57 and connected at its CO terminal to the Ci terminal of the full adder $52_{16}$.

The full adder $52_{16}$ is connected at its $in_1$ terminal to the output terminal of the inverter $54_4$, connected at its s terminal to the $S_7$ terminal of the output unit 57, and connected at its CO terminal to the $S_8$ terminal of the output unit 57 via the inverter $54_5$.

Below, an explanation will be made of the operation of the processing apparatus 40 shown in FIG. 1.

Figure 4:
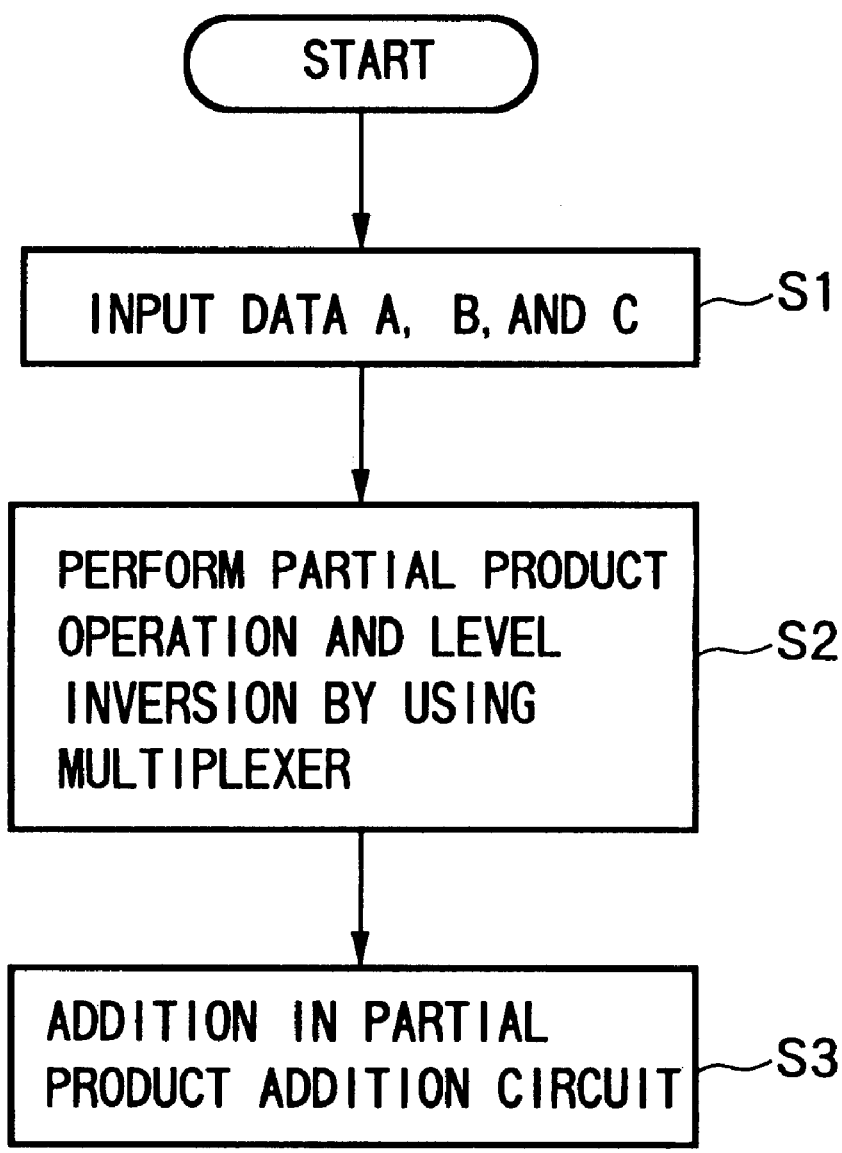
FIG. 4 is a flow chart for explaining the operation of the processing apparatus shown in FIG. 1.

FIG. 4 is a flow chart for explaining the processing method in the processing apparatus 40.

[Step S1]

Bit data $A_0, B_0, A_1, B_1, A_2, B_2, A_3$, and $B_3$ are input to the $A_0, B_0, A_1, B_1, A_2, B_2, A_3$, and $B_3$ terminals of the input unit 55. Further, the bit data $C_0, C_{1, C2}$, and $C_3$ are input to the $C_0, C_1, C_2$, and $C_3$ terminals of the input unit 56.

Then the selections of the bit data $A_0$ to $A_3$ and $B_0$ to $B_3$ at the multiplexers $50_0$ to $50_{15}$ shown below are simultaneously carried out, and the selected bit data are output to corresponding half adders and full adders.

Specifically, at the multiplexer $50_0$, when the bit data $C_0$ has the logical value "1", the bit data $A_0$ is output from the o terminal to the $in_1$ terminal of the half adder $53_1$, while when the bit data $C_0$ has the logical value "0", the bit data $B_0$ is output from the o terminal to the $in_1$ terminal of the half adder $53_1$.

At the multiplexer $50_1$, when the bit data $C_0$ has the logical value "1", the bit data $A_1$ is output from the o terminal to the $in_2$ terminal of the full adder $52_1$, while when the bit data $C_0$ has the logical value "0", the bit data $B_1$ is output from the o terminal to the $in_2$ terminal of the full adder $52_1$.

At the multiplexer $50_3$, when the bit data $C_0$ has the logical value "1", the bit data $A_2$ is output from the o terminal to the $in_1$ terminal of the half adder $53_2$, while when the bit data $C_0$ has the logical value "0", the bit data $B_2$ is output from the o terminal to the $in_1$ terminal of the half adder $53_2$.

At the multiplexer $50_6$, when the bit data $C_0$ has the logical value "1", the bit data $A_3$ is output from the o terminal to the Ci terminal of the full adder $52_3$, while when the bit data $C_0$ has the logical value "0", the bit data $B_3$ is output from the o terminal to the Ci terminal of the full adder $52_3$.

At the multiplexer $50_2$, when the bit data $C_1$ has the logical value "1", the bit data $A_0$ is output from the o terminal to the $in_1$ terminal of the full adder $52_1$, while when the bit data $C_1$ has the logical value "0", the bit data $B_0$ is output from the o terminal to the $in_1$ terminal of the full adder $52_1$.

At the multiplexer $50_4$, when the bit data $C_1$ has the logical value "1", the bit data $A_1$ is output from the o terminal to the $in_2$ terminal of the full adder $52_2$, while when the bit data $C_1$ has the logical value "0", the bit data $B_1$ is output from the o terminal to the $in_2$ terminal of the full adder $52_2$.

At the multiplexer $50_7$, when the bit data $C_1$ has the logical value "1", the bit data $A_2$ is output from the o terminal to the $in_2$ terminal of the full adder $52_3$, while when the bit data $C_1$ has the logical value "0", the bit data $B_2$ is output from the o terminal to the $in_2$ terminal of the full adder $52_3$.

At the multiplexer $50_{10}$, when the bit data $C_1$ has the logical value "1", the bit data $A_3$ is output from the o terminal to the Ci terminal of the full adder $52_5$, while when the bit data $C_1$ has the logical value "0", the bit data $B_3$ is output from the o terminal to the Ci terminal of the full adder $52_5$.

At the multiplexer $50_5$, when the bit data $C_2$ has the logical value "1", the bit data $A_0$ is output from the o terminal to the $in_1$ terminal of the full adder $52_2$, while when the bit data $C_2$ has the logical value "0", the bit data $B_0$ is output from the o terminal to the $in_1$ terminal of the full adder $52_2$.

At the multiplexer $50_8$, when the bit data $C_2$ has the logical value "1", the bit data $A_1$ is output from the o terminal to the $in_2$ terminal of the half adder $53_3$, while when the bit data $C_2$ has the logical value "0", the bit data $B_1$ is output from the o terminal to the $in_2$ terminal of the half adder $53_3$.

At the multiplexer $50_{11}$, when the bit data $C_2$ has the logical value "1", the bit data $A_2$ is output from the o terminal to the $in_2$ terminal of the full adder $52_5$, while when the bit data $C_2$ has the logical value "0", the bit data $B_2$ is output from the o terminal to the $in_2$ terminal of the full adder $52_2$.

At the multiplexer $50_{13}$, when the bit data $C_2$ has the logical value "1", the bit data $A_3$ is output from the o terminal to the $in_2$ terminal of the full adder $52_8$, while when the bit data $C_2$ has the logical value "0", the bit data $B_3$ is output from the o terminal to the $in_2$ terminal of the full adder $52_8$.

At the multiplexer $50_9$, when the bit data $C_3$ has the logical value "1", the bit data $A_0$ is output from the o terminal to the $in_2$ terminal of the half adder $53_3$, while when the bit data $C_3$ has the logical value "0", the bit data $B_0$ is output from the o terminal to the $in_2$ terminal of the half adder $53_3$.

At the multiplexer $50_{12}$, when the bit data $C_3$ has the logical value "1", the bit data $A_1$ is output from the o terminal to the $in_1$ terminal of the full adder $52_5$, while when the bit data $C_3$ has the logical value "0", the bit data $B_1$ is output from the o terminal to the $in_1$ terminal of the full adder $52_5$.

At the multiplexer $50_{14}$, when the bit data $C_3$ has the logical value "1", the bit data $A_2$ is output from the o terminal to the $in_1$ terminal of the full adder $52_8$, while when the bit data $C_3$ has the logical value "0", the bit data $B_2$ is output from the o terminal to the $in_1$ terminal of the full adder $52_8$.

At the multiplexer $50_{15}$, when the bit data $C_3$ has the logical value "1", the bit data $A_3$ is output from the o terminal to the $in_1$ terminal of the full adder $52_1$ while when the bit data $C_3$ has the logical value "0", the bit data $B_3$ is output from the o terminal to the $in_1$ terminal of the full adder $52_{10}$.

Further, the bit data $B_0$ from the $B_0$ terminal of the input unit 55 is output to the $in_2$ terminal of the half adder $53_1$.

The bit data $B_1$ from the $B_1$ terminal of the input unit 55 is output to the Ci terminal of the full adder $52_1$.

The bit data $B_2$ from the $B_2$ terminal of the input unit 55 is output to the $in_2$ terminal of the half adder $53_2$.

The bit data $B_3$ from the $B_3$ terminal of the input unit 55 is output to the $in_2$ terminal of the full adder $52_4$.

Further, the bit data $B_0$ from the $B_0$ terminal of the input unit 55 is inverted at the inverter circuit $54_1$, and then output to the $in_2$ terminal of the full adder $52_6$.

The bit data $B_1$ from the $B_1$ terminal of the input unit 55 is inverted at the inverter circuit $54_2$, and then output to the Ci terminal of the full adder $52_8$.

The bit data $B_2$ from the $B_2$ terminal of the input unit 55 is inverted at the inverter circuit $54_3$, and then output to the $in_2$ terminal of the full adder $52_{10}$.

The bit data $B_3$ from the $B_3$ terminal of the input unit 55 is inverted at the inverter circuit $54_4$, and then output to the $in_1$ terminal of the full adder $52_{16}$ of the final stage adder circuit 42

[Step S2]

At the half adder $53_1$, the addition of the bit data $B_0$ and the bit data from the multiplexer $50_0$ is carried out, the sum data of the related addition results is output from the s terminal to the $S_0$ terminal, and the carry data of the related addition result is output from the Co terminal to the $in_2$ terminal of the half adder $53_4$ of the final stage adder circuit 42.

In the full adder $52_1$, the addition of the bit data $B_1$, the bit data from the multiplexer $50_1$ and the bit data from the multiplexer $50_2$ is carried out, the sum data of the related addition results is output from the s terminal to the $in_1$ terminal of the half adder $53_5$ of the final stage adder circuit 42, and the carry data of the related addition result is output from the Co terminal to the $in_2$ terminal of the full adder $52_{11}$ of the final stage adder circuit 42.

At the half adder $53_2$, the addition of the bit data $B_2$ and the bit data from the multiplexer $50_3$ is carried out, the sum data of the related addition results is output from the s terminal to the Ci terminal of the full adder $52_2$, and the carry data of the related addition result is output from the Co terminal to the Ci terminal of the full adder $52_4$.

At the half adder $53_3$, the addition of the bit data from the multiplexer $50_8$ and the bit data from the multiplexer $50_9$ is carried out, the sum data of the related addition results is output from the s terminal to the $in_1$ terminal of the full adder $52_3$, and the carry data of the related addition result is output from the Co terminal to the $in_2$ terminal of the full adder $52_7$.

At the full adder $52_5$, the addition of the bit data from the multiplexer $50_{10}$, the bit data from the multiplexer $50_{11}$, and the bit data from the multiplexer $50_{12}$ is carried out, the sum data of the related addition results is output from the s terminal to the $in_1$ terminal of the full adder $52_6$, and the carry data of the related addition result is output from the Co terminal to the $in_2$ terminal of the full adder $52_9$.

At the full adder $52_8$, the bit data $B_1^-$ from the inverter circuit $54_2$, the bit data from the multiplexer $50_{13}$, and the bit data from the multiplexer $50_{14}$ are added, the sum data of the related addition results is output from the s terminal to the $in_1$ terminal of the full adder $52_9$, and the carry data of the related addition result is output from the Co terminal to the Ci terminal of the full adder $52_{10}$.

Further, at the full adder $52_2$, the sum data from the half adder $53_2$, the bit data from the multiplexer $50_4$, and the bit data from the multiplexer $50_5$ are added, the sum data of the related addition results is output from the s terminal to the $in_1$ terminal of the full adder $52_{11}$ of the final stage adder circuit 42, and the carry data of the related addition result is output from the Co terminal to the $in_2$ terminal of the full adder $52_{12}$ of the final stage adder circuit 42.

At the full adder $52_3$, the bit data from the multiplexer $50_6$, the bit data from the multiplexer $50_7$, and the sum data from the half adder $53_3$ are added, the sum data of the related addition results is output from the s terminal to the $in_1$ terminal of the full adder $52_4$, and the carry data of the related addition result is output from the Co terminal to the Ci terminal of the full adder $52_7$.

At the full adder $52_6$, the addition of the logical value "1" input to the Ci terminal, the bit data $B_1^-$ from the inverter $54_1$, and the sum data from the s terminal of the full adder $52_5$ is carried out, the sum data of the related addition results is output from the s terminal to the $in_1$ terminal of the full adder $52_7$, and the carry data of the related addition result is output from the Co terminal to the Ci terminal of the full adder $52_9$.

At the full adder $52_{10}$, the carry data from the full adder $52_8$, the bit data $B_2^-$ from the inverter circuit $54_3$, and the bit data from the multiplexer $50_{15}$ are added, the sum data of the related addition results is output from the s terminal to the $in_1$ terminal of the full adder $52_{15}$ of the final stage adder circuit 42, and the carry data of the related addition result is output from the Co terminal to the $in_2$ terminal of the full adder $52_{16}$.

Further, at the full adder $52_4$, the addition of the carry data from the half adder $53_2$, the bit data $B_3$, and the sum data from the full adder $53_3$ is carried out, the sum data of the related addition results is output from the s terminal to the $in_1$ terminal of the full adder $52_{12}$ of the final stage adder circuit 42, and the carry data of the related addition result is output from the Co terminal to the $in_2$ terminal of the full adder $52_{13}$.

At the full adder $52_7$, the carry data from the full adder $52_3$, the carry data from the half adder $53_3$, and the sum data from the full adder $52_6$ are added, the sum data of the related addition results is output from the s terminal to the $in_1$ terminal of the full adder $52_{13}$ of the final stage adder circuit 42, and the carry data of the related addition result is output from the Co terminal to the $in_2$ terminal of the full adder $52_{14}$ of the final stage adder circuit 42.

At the full adder $52_9$, the carry data from the full adder $52_6$, the carry data from the full adder $52_5$, and the sum data from the full adder $52_8$ are added, the sum data of the related addition results is output from the s terminal to the $in_1$ terminal of the full adder $52_{14}$ of the final stage adder circuit 42, and the carry data of the related addition result is output from the Co terminal to the $in_2$ terminal of the full adder $52_{15}$ of the final stage adder circuit 42.

[Step S3]

At the final stage adder circuit 42, the following processing is carried out.

First, at the half adder $53_4$, the addition of the carry data from the half adder $53_1$ and the sum data from the full adder $52_1$ is carried out, the sum data thereof is output from the $S_1$ terminal of the output unit 57 as the bit data $S_1$, and the carry data thereof is output to the Ci terminal of the full adder $52_{11}$.

Next, at the full adder $52_{11}$, the carry data from the half adder $53_4$, the carry data from the full adder $52_1$, and the sum data from the full adder $52_2$ are added, the sum data thereof is output from the $S_2$ terminal of the output unit 57 as the bit data $S_2$, and the carry data thereof is output to the Ci terminal of the full adder $52_{12}$.

Next, at the full adder $52_{12}$, the carry data from the full adder $52_{11}$, the carry data from the full adder $52_2$, and the sum data from the full adder $52_4$ are added, the sum data thereof is output from the $S_3$ terminal of the output unit 57 as the bit data $S_3$, and the carry data thereof is output to the Ci terminal of the full adder $52_{13}$.

Next, at the full adder $52_{13}$, the carry data from the full adder $52_{12}$, the carry data from the full adder $52_4$, and the sum data from the full adder $52_7$ are added, the sum data thereof is output from the $S_4$ terminal of the output unit 57 as the bit data $S_4$, and the carry data thereof is output to the Ci terminal of the full adder $52_{14}$.

Next, at the full adder $52_{14}$, the carry data from the full adder $52_{13}$, the carry data from the full adder $52_7$, and the sum data from the full adder $52_9$ are added, the sum data thereof is output from the $S_5$ terminal of the output unit 57 as the bit data $S_5$, and the carry data thereof is output to the Ci terminal of the full adder $52_{15}$.

Next, at the full adder $52_{15}$, the carry data from the full adder $52_{14}$, the carry data from the full adder $52_9$, and the sum data from the full adder $52_0$ are added, the sum data thereof is output from the $S_6$ terminal of the output unit 57 as the bit data $S_6$, and the carry data thereof is output to the Ci terminal of the full adder $52_{16}$.

Next, at the full adder $52_{16}$, the carry data from the full adder $52_{15}$, the carry data from the full adder $52_{10}$, and the bit data $B_3^-$ from the inverter $54_4$ are added, the sum data thereof is output from the $S_7$ of the output unit 57 as the bit data $S_7$, and the carry data thereof is output via the inverter $54_5$ from the $S_8$ terminal of the output unit 57 as the bit data $S_8$.

Here, the bit data $S_8$ indicates the sign. When the bit data $S_8$ has the logical value "1", it indicates that the data S of the result of the operation "(A–B)×C" is negative, while when the bit data $S_8$ has the logical value "0", it indicates that the data S is positive.

Note that, when the bit data $S_8$ has the logical value "1", the bit data $S_0$ to $S_7$ indicate the complement value of 2 of the result of the operation "(A–B)×C".

Figure 5:
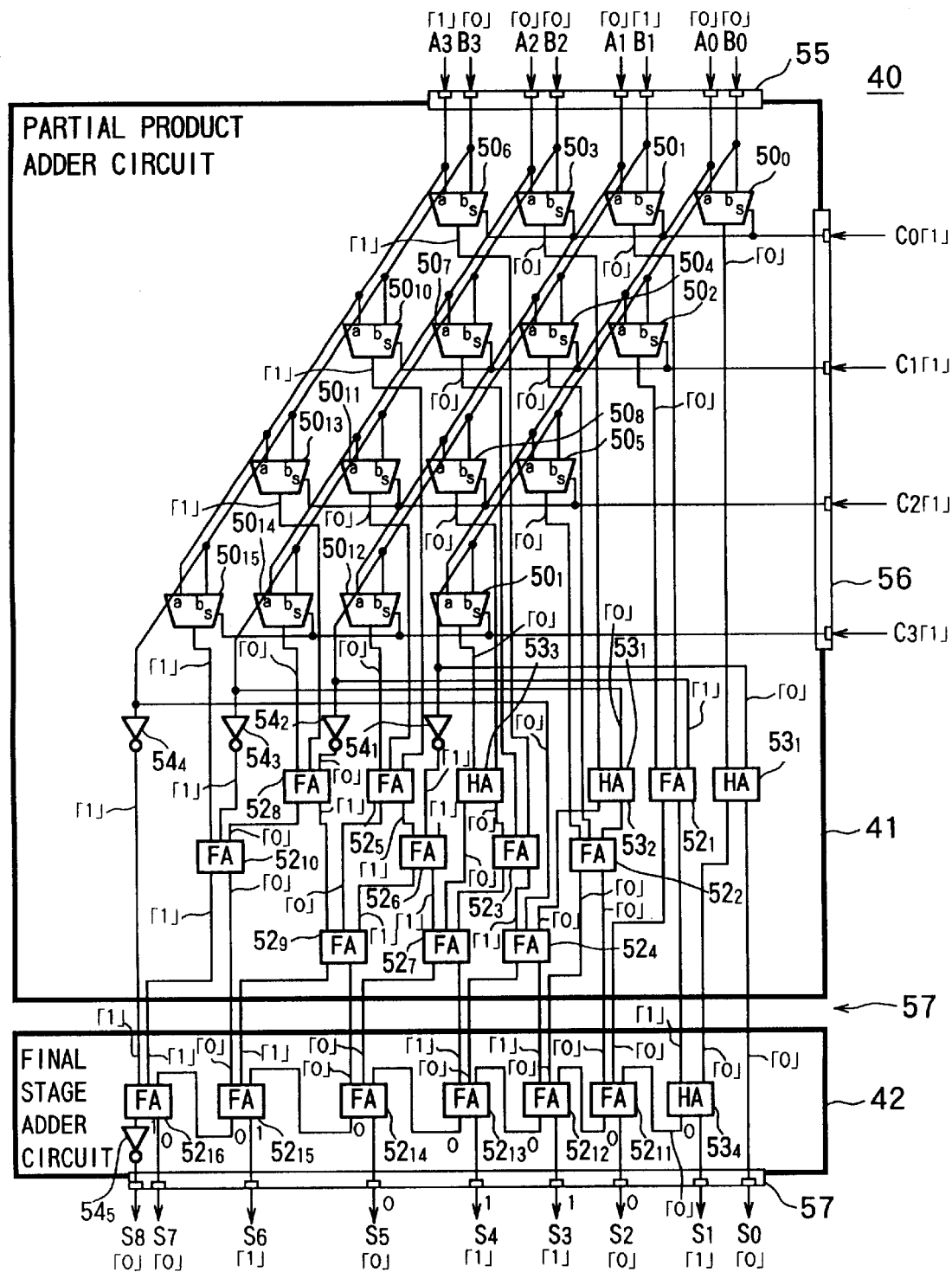
FIG. 5 is a view for explaining a concrete operation in the processing apparatus shown in FIG. 1.

In the processing apparatus 40 shown in FIG. 1, for example, as shown in FIG. 5, where data A ($A_0$, $A_1$, $A_2$, $A_3$)=(0, 0, 0, 1), B ($B_0$, $B_1$, $B_2$, $B_3$)=(0, 0, 1, 0) and C ($C_0$, $C_1$, $C_2$, $C_3$)=(1, 1, 1, 1) are input, data S ($S_0$, $S_1$, $S_2$, $S_3$, $S_4$, $S_5$, $S_6$, $S_7$, $S_8$)=(0, 1, 0, 1, 1, 0, 1, 0, 0) is output.

Figure 6:
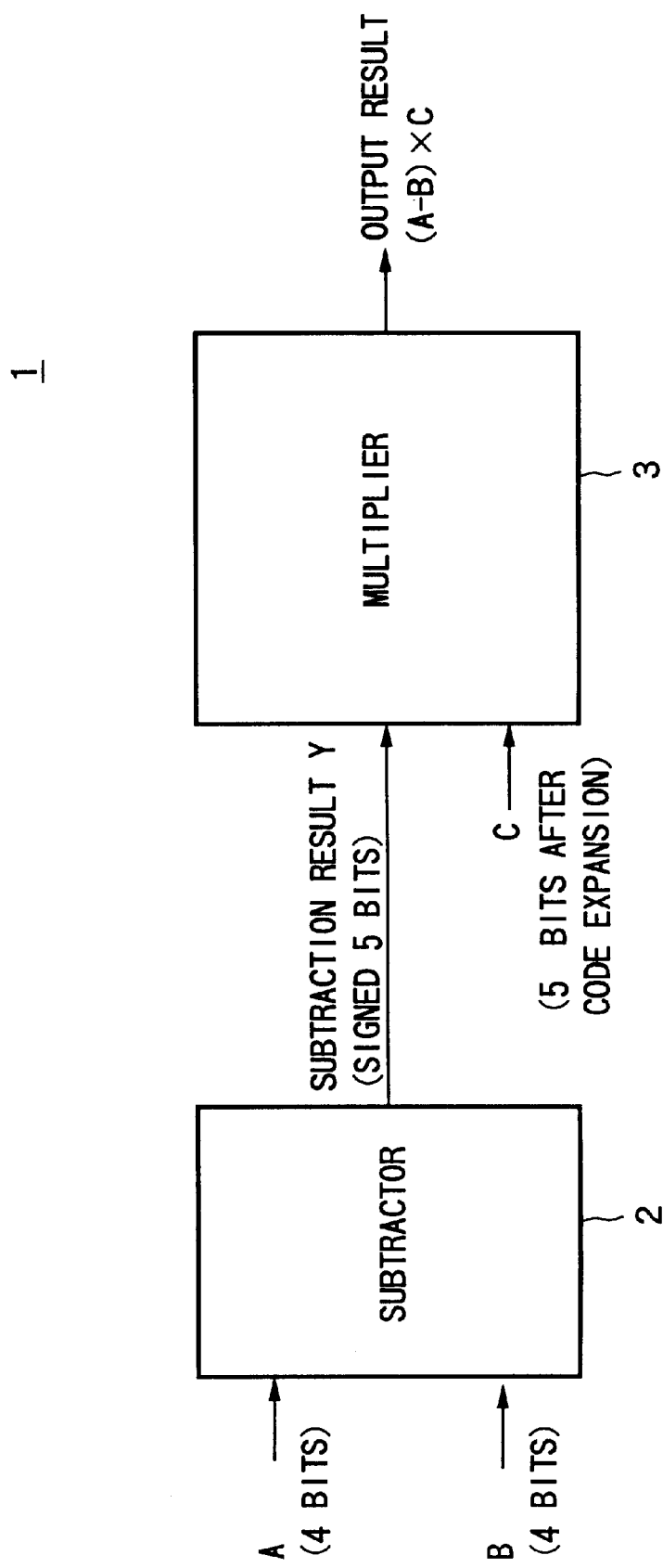
FIG. 6 is a view of the configuration of the processing apparatus of the related art performing an operation "(A−B)×C"
Figure 7:
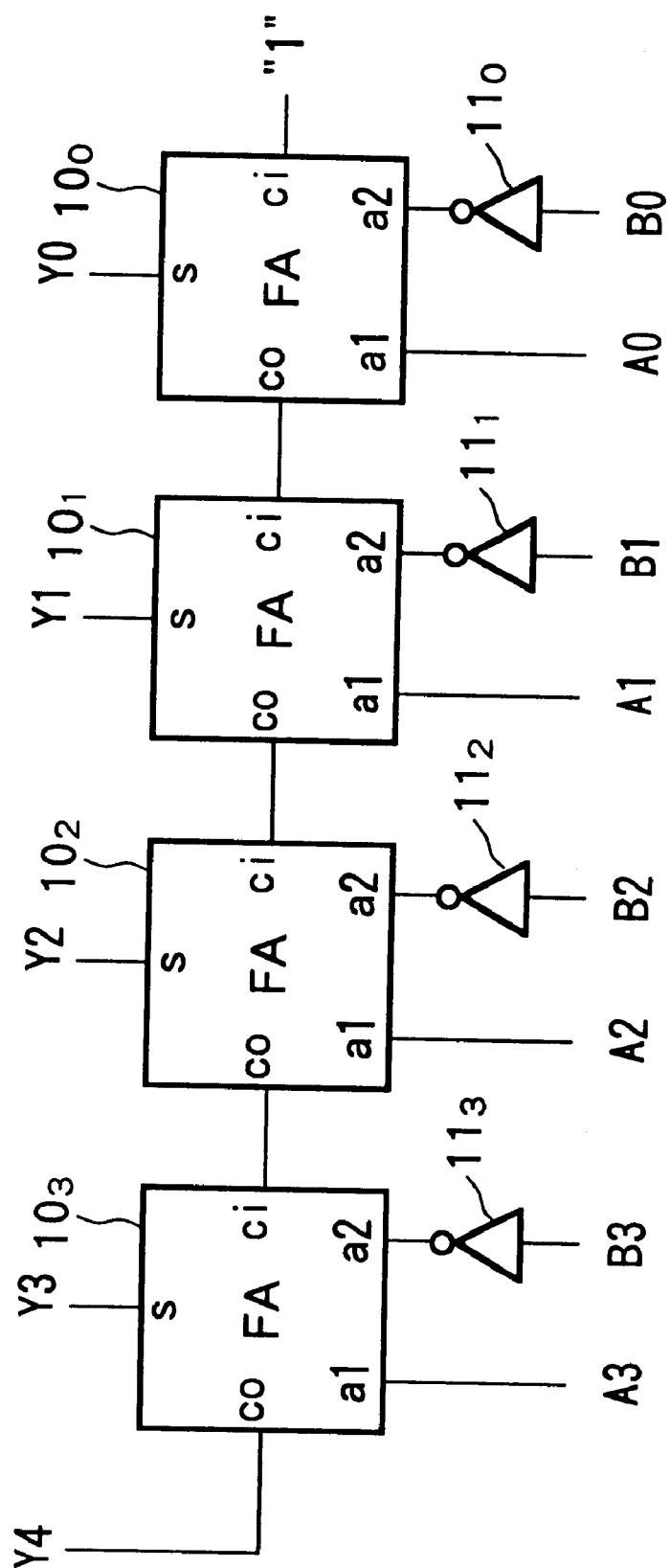
FIG. 7 is a view of the configuration of a subtracter shown in FIG. 6.
Figure 10:
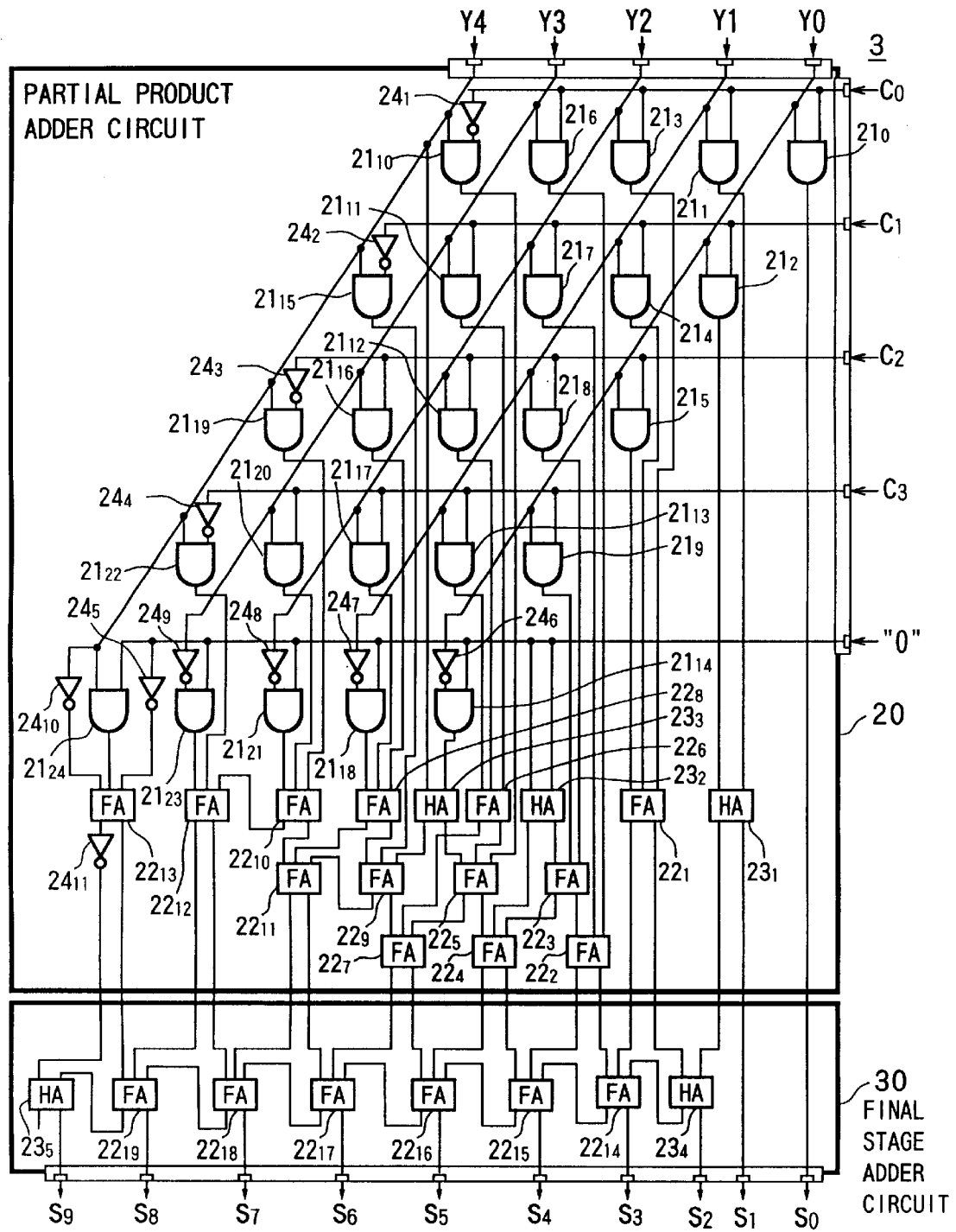
FIG. 10 is a view of the configuration of the multiplier for performing the complement multiplication of 2 shown in FIG. 9.

As explained above, according, to the processing apparatus 40, as shown in FIG. 1, the operation "(A–B)×C" can be carried out by the multiplexers $50_0$ to $50_{15}$, full adders (FA) $52_1$ to $52_{16}$, half adder (HA) $53_1$ to $53_4$, inverter circuits $54_1$ to $54_4$, input units 55 and 56, and the output unit 57. It is not necessary to use the multiplier of 5 bits as in the processing apparatus 1 of the related art shown in FIG. 6, FIG. 7, and FIG. 10 mentioned above, thus the circuit size can be greatly reduced.

Further, according to the processing apparatus 40, the critical path of the operation becomes the multiplexer $50_0$, half adders $53_1$ and $53_4$, full adders $52_{11}$, $52_{12}$, $52_{13}$, $52_{14}$, $52_{15}$, and $52_{16}$, and the inverter circuit $54_5$, so the critical path can be shortened compared with the processing apparatus 1 of the related art mentioned above, and thus the operation time can be shortened.

The embodiment of the present invention is not limited to that mentioned above.

For example, in FIG. 1, a case where the operation "(A–B)×C" was carried out by using 4-bit data A, B, and C was exemplified, but the present invention can be applied also to a case where the operation "(A–B)×C" is carried out by using n-bit data A, B, and C for all integers n of 2 or more.

In this case, the operation is carried out based on the following equation (9).

$$S = \left( \sum_{j=0}^{j=n-1} \sum_{i=0}^{i=n-1} 2^{i+j} \cdot P_{ij} \right) - 2^n \times B + B \quad (9)$$

In the above equation (9), the operation of the first term is carried out by the addition for every bit containing the carry data from the lower significant bit so as to select the bit data $A_i$ when the bit data $C_j$ has the logical value "1" by using the multiplexer as the bit data selecting means of the present invention, select the bit data $B_i$ when the bit data $C_j$ has the logical value "0", and add the selected data to the (i+j)th bit.

Further, in the above equation (9), the operation of "$-2^n \times B$" is carried out by finding the complement of 2 of the data B by inverting the level of the data B, adding "1" to the LSB of this level-inverted data, and shifting the addition result by exactly n bits toward the MSB. The shift is realized by inputting for example bit data $B_0$ to $B_{n-1}$ as the addition result to the adder for performing the addition corresponding to (n to 2n-1)th bits of the result.

Then, by adding the result of the first term of the above equation (9), the result of "$-2^n \times B$", and the data B, the operation of the above equation (9) is carried out.

Summarizing the effect of the invention, as explained above, according to the processing apparatus of the present invention and the method of same, the time of the operation "(A-B)×C" can be shortened.

Further, according to the processing apparatus of the present invention, the size of the device for performing the operation "(A-B)×C" can be reduced.

While the invention has been described by reference to specific embodiments chosen for purposes of illustration, it should be apparent that numerous modifications could be made thereto by those skilled in the art without departing from the basic concept and scope of the invention.

What is claimed is:

1. A processing apparatus for calculating "(A-B)×C" where the bit data A is constituted by the n-bit data of $A_i$ (i=0, 1, ... n-1), the bit data B is constituted by the n-bit data of $B_i$ (i=0, 1, ... n-1), and the bit data C is constituted by the n-bit data of $C_j$ (j=0, 1, ... n-1), said processing apparatus comprising:

a bit data selecting means for receiving as input the bit data $A_i$, $B_i$, and $C_j$, and outputting the bit data $A_i$ when $C_j$ equals to a first logical value or the bit data $B_i$ when data $C_j$ equals to a second logical value in response to data $C_j$ with respect to all combinations of the natural numbers i and j; and, an adding means for adding the bit data output from the bit data selecting means to the (i+j)th bit for each bit of all combinations of i and j, the data obtained by shifting the data of the complement of 2 of the data B by exactly n number of bits toward the most significant bit, and the data B.

2. A processing apparatus as set forth in claim 1, wherein said bit selecting means includes (n-rows)×(n-columns) number of bit selectors, and the bit selector of i-th row and j-th column inputs the bit data $A_i$ and $B_i$ and outputs the bit data $A_i$ or $B_i$ in response to the bit data $C_j$.

3. A processing apparatus as set forth in claim 1, further comprising an inverted value generating means for inverting the bit data $B_0$, $B_1$, ..., $B_i$, ..., $B_{n-2}$, and $B_{n-1}$ to find the bit data $B_0^-$, $B_1^-$, ..., $B_i^-$, ..., $B_{n-2}^-$, and $B_{n-1}^-$;

said adding means respectively adds the bit data $B_1^-$, ..., $B_i^-$, ..., $B_{n-1}^-$ found by the inverted value generating means to the (n+1)th, ..., (n+i)th, ..., (2n-1)th bits; and adds the bit data $B_0^-$ and the logical value "1" to the n-th bit.

4. A processing apparatus as set forth in claim 1, wherein said adding means adds the bit data $B_0$, $B_1$, ..., $B_i$, ..., $B_{n-2}$, and $B_{n-1}$ of the data B to the 0th, 1st, ..., i-th, ..., (n-2)th, and (n-1)th bits.

5. A processing apparatus as set forth in claim 1, wherein:

the adding means outputs as the result of the addition (2n+1)bit data comprised of the bit data $S_0$, $S_1$, ..., $S^{2n-}$, and $S_{2n}$ and the bit data $S_{2n}$ shows the sign value.

6. A processing apparatus as set forth in claim 1, wherein the bit data selecting means each has a first transmission gate which becomes conductive when the input bit data $C_i$ is the first logical value and a second transmission gate which becomes conductive when the input bit data $C_i$ is the second logical value.

7. A processing method for calculating "(A-B)×C" where the bit data A is constituted by the n-bit data of $A_i$ (i=0, 1, ... n-1), the bit data B is constituted by the n-bit data of $B_i$ (i=0, 1, ... n-1), and the bit data C is constituted by the n-bit data of $C_j$ (J=0, 1, ... n-1), said processing method comprising the steps of:

performing processing for receiving as input the bit data $A_i$, $B_i$, and $C_j$, selecting the bit data $A_i$ when data $C_j$ equals to a first logical value or $B_i$ when data $C_j$ equals to a second logical value in response to the bit data $C_j$ with respect to all combinations of the natural numbers i and j; and adding the selected bit data to the (i+j)th bit for each bit of all combinations of i and j, the data obtained by shifting the data of the complement of 2 of the data B by exactly n number of bits toward the most significant bit, and the data B.

8. A processing method as set forth in claim 7, further comprising the steps of:

inverting the bit data $B_0$, $B_1$, ..., $B_i$, ..., $B_{n-2}$, and $B_{n-1}$ to find the bit data $B_0^-$, $B_1^-$, ..., $B_i^-$, ..., $B_{n-2}^{-31}$, and $B_{n-1}^-$;

adding the bit data $B_1^-$, ... $B_i^-$, ..., $B_{n-1}^-$ to the (n+1)th, ..., (n+i)th, ..., (2n-1)th bits; and adding the bit data $B_0^-$ and the logical value "1" to the n-th bit.

9. A processing method as set forth in claim 7, further comprising the step adding the bit data $B_0$, $B_1$, ..., $B_i$, ..., $B_{n-2}$, and $B_{n-1}$ of the data B to the 0th, 1st, ..., i-th, ..., (n-2)th, and (n-1)th bits.

10. A processing method as set forth in claim 7, further comprising the step of:

outputting as the result of the addition (2n+1)bit data comprised of the bit data $S_0$, $S_1$, ..., $S_{2n-1}$, and $S_{2n}$ and the bit data $S_{2n}$ indicating the sign value.

* * * * *

UNITED STATES PATENT AND TRADEMARK OFFICE
CERTIFICATE OF CORRECTION

PATENT NO. : 6,370,557 B1
DATED : April 8, 2002
INVENTOR(S) : Koichi Onuma

It is certified that error appears in the above-identified patent and that said Letters Patent is hereby corrected as shown below:

Column 14,
Line 16, change "$S^{2n}$" to -- $S_{2n-1}$ --.
Line 29, change "J=O" to -- j=O --.
Line 47, change "$B_{n-2}^{31}$" to -- $B_{n-2}$ --.

Signed and Sealed this

Twenty-third Day of September, 2003

JAMES E. ROGAN
*Director of the United States Patent and Trademark Office*